(12) United States Patent
Lawson et al.

(10) Patent No.: US 7,281,097 B1
(45) Date of Patent: Oct. 9, 2007

(54) METHOD OF CONTROLLING THE PERFORMANCE OF A DATA STORAGE SYSTEM

(75) Inventors: Malcolm Lawson, Boylston, MA (US); Manish Madhukar, Westborough, MA (US); Rasa Matulioniene, Westborough, MA (US); Matthew Norgren, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 499 days.

(21) Appl. No.: 10/881,530

(22) Filed: Jun. 30, 2004

(51) Int. Cl.
  *G06F 12/00* (2006.01)
(52) U.S. Cl. .................. 711/154; 711/156
(58) Field of Classification Search ............ None
  See application file for complete search history.

(56) References Cited

U.S. PATENT DOCUMENTS 5,459,837 A * 10/1995 Caccavale .......... 709/226

OTHER PUBLICATIONS

Manual Duque-Anton, "Constructing efficient simulated annealing algorithms", received Sep. 1, 1995; revised Jul. 29, 1996 Discrete Applied Mathematics © 1997 Elsevier Science.*
Momoh, J.A., Wang Y., Eddy-Posey, F. "Optimal power dispatch of photovoltaic system with random load", Jun. 6-10, 2004, Power Engineering Society General Meeting, 2004, IEEE.*

* cited by examiner

*Primary Examiner*—Reginald Bragdon
*Assistant Examiner*—Horace L. Flournoy
(74) *Attorney, Agent, or Firm*—Krishnendu Gupta; Scott A. Ouellette

(57) ABSTRACT

A method for optimizing the operation of a data storage system utilizes a genetic algorithm to adjust internal parameters of the system. The method involves determining a set of optimum values of each of two or more different data array parameters, such as data request types that will be processed concurrently, to achieve performance goals that are set by the user for the system. The optimum values are determined by iteratively evaluating the performance of the system while it processes the different combinations of values of the two or more data requests, saving the combinations of numbers that yield performance parameters that approach the goal and eliminating combinations of number of data request types that do not.

41 Claims, 4 Drawing Sheets

METHOD OF CONTROLLING THE PERFORMANCE OF A DATA STORAGE SYSTEM

FIELD OF THE INVENTION

The present invention is directed generally to a method of controlling the performance of a data storage system and, more particularly, to a method for optimizing the performance of a data storage system by using a genetic algorithm to adjust internal system parameters to achieve a desired performance of the system.

BACKGROUND OF THE INVENTION

A data storage system stores and retrieves information on behalf of one or more external client computers. A typical data storage system includes a network adapter, storage processing circuitry and a set of disk drives. The network adapter provides connectivity between the external client computers and the storage processing circuitry. The storage processing circuitry performs a variety of data storage operations (e.g., load operations, store operations, read-modify-write operations, etc.) as well as provides cache memory which enables the data storage system to optimize its operations (e.g., to provide high-speed storage, data pre-fetching, etc.). The set of disk drives provides robust data storage capacity, but in a slower and non-volatile manner.

The storage processing circuitry of some data storage systems includes multiple storage processors for greater availability and/or greater data storage throughput. In such systems, each storage processor is individually capable of performing data storage operations.

Furthermore, each storage processor is capable of processing a maximum number of active data requests concurrently. Typically, the storage processor will process several different types of data request from different applications running on the external client computers, such as different types and sizes of read and write operations. It would be advantageous to instruct the storage processors to process more of one or more types of data requests to achieve a desired performance goal. Currently, the only way to instruct the storage processor to processes certain numbers of particular data request types is to directly program the data storage system to input the certain number of the particular type of data requests to the storage processor. If the desired performance goal is not met, the system must be reprogrammed with new numbers of the particular data request types to process. This process is very time consuming and does not enable the system to adapt to changing environments and needs of the data storage system. Fixed controls, such as throttles, do not work because their impact on the data storage system environment cannot be predicted.

SUMMARY OF THE INVENTION

The present invention is directed to a method for optimizing the operation of a data storage system which utilizes a genetic algorithm to adjust internal parameters of the system. The method involves determining a set of optimum values of each of two or more different data array parameters, such as data request types that will be processed concurrently, to achieve performance goals that are set by the user for the system. The optimum values are determined by iteratively evaluating the performance of the system while it processes the different combinations of values of the two or more data requests, saving the combinations of numbers that yield performance parameters that approach the goal and eliminating combinations of numbers of data request types that do not.

According to one aspect of the invention, a method of controlling the performance of a data storage system which concurrently processes a number N of data requests, of which, a number A are of a first data request type and a number B are of a second data request type, includes:

(A) setting a performance goal for the data storage system; and
(B) determining, through the use of a genetic algorithm, an optimum number $A_O$ of the first data request type and an optimum number $B_O$ of the second data request type to concurrently process, to achieve the performance goal for the data storage system.

Step B of the method may include:
(C) randomly selecting an initial set of solutions, each solution including initial numbers $A_I$ of the first data request type and $B_I$ of the second data request type;
(D) evaluating each solution in the set for a period of time by processing the number $A_I$ of first data request types and $B_I$ second data request types, measuring the performance parameter of the data storage system, comparing the measured performance to the performance goal and assigning a fitness value to the solution based on the comparison, wherein solutions having a greater fitness value yield a performance parameter closer to the performance goal than those having a lesser fitness value;
(E) selecting two of the solutions from the set by performing a weighted random selection, based on the fitness value assigned to each solution;
(F) combining the two selected solutions to obtain a new solution including a number $A_N$ of first data request types and number $B_N$ of second data request types;
(G) evaluating the new solution by processing the number $A_N$ of first data request types and $B_N$ second data request types, measuring the performance of the data storage system, comparing the measured performance to the performance goal and assigning a fitness value to the new solution based on the comparison;
(H) including the new solution in the set of solutions;
(I) eliminating the solution in the set having the lowest fitness value; and
(J) repeating steps (E) through (I) to generate a set of solutions having increased fitness values.

The method may further include, in less than all of the new solutions, randomly altering the new solution after step (F). The randomly altering step may include applying a mutation function to the new solution. The random altering step may be performed in less than approximately 10% of the new solutions. The random altering step may be performed in approximately 5% of the new solutions. The performance parameter may include one of inputs/outputs per second, a response time for a request type and a throughput amount for a request type. Furthermore, the sum of A and B may equal N. The set of solutions may include a first list of solutions for the first data request type and a second list of solutions for the second data request type. In Step E, one solution may be selected from each of the first and second lists in the set. Fitness values assigned to solutions in the first list may be weighted differently than fitness values assigned to solutions in the second list.

According to another aspect, a method of controlling the performance of a data storage system which concurrently processes a number N of data requests, of which, a number A are of a first data request type and a number B are of a second data request type, includes:

(A) setting a performance goal for the data storage system; and (B) randomly selecting an initial set of solutions, each solution including initial numbers $A_I$ of the first data request type and $B_I$ of the second data request type;

(C) evaluating each solution in the set for a period of time by processing the number $A_I$ of first data request types and $B_I$ second data request types, measuring the performance of the data storage system, comparing the measured perforce to the performance goal and assigning a fitness value to the solution based on the comparison, wherein solutions having a greater fitness value yield a performance closer to the goal than those having a lesser fitness value;

(D) selecting two of the solutions from the set by performing a weighted random selection, based on the fitness value assigned to each solution;

(E) combining the two selected solutions to obtain a new solution including a number $A_N$ of first data request types and a number $B_N$ of second data request types;

(F) evaluating the new solution by processing the number $A_N$ of first data request types and $B_N$ second data request types, measuring the preference of the data storage system, comparing the measured performance to the goal and assigning a fitness value to the new solution based on the comparison;

(G) including the new solution in the set of solutions;

(H) eliminating the solution in the set having the lowest fitness value; and (I) repeating steps (D) through (H) to generate a set of solutions having increased fitness values.

According to another aspect, a method of controlling the performance of a data storage system which concurrently processes a number N of data requests, of which, a number A are of a first data request type, a number B are of a second data request type and a number C are of data request types other than the first and second data request types, includes:

(A) setting a performance goal for the data storage system; and (B) randomly selecting an initial set of solutions, each solution including initial numbers $A_I$ of the first data request type, $B_I$ of the second data request type and $C_I$ of the other data request types;

(C) evaluating each solution in the set for a period of time by processing the number $A_I$ of first data request types, $B_I$ second data request types and $C_I$ of the other data request types, measuring the performance of the data storage system, comparing the measured performance to the performance goal and assigning a fitness value to the solution based on the comparison, wherein solutions having a greater fitness value yield a performance closer to the performance goal than those having a lesser fitness value;

(D) selecting two of the solutions from the set by performing a weighted random selection, based on the fitness value assigned to each solution;

(E) combining the two selected solutions to obtain a new solution including a number $A_N$ of first data request types, a number $B_N$ of second data request types and a number $C_N$ of other data request types;

(F) evaluating the new solution by processing the number $A_N$ of first data request types, the number $B_N$ of second data request types and the number $C_N$ of other data request types, measuring the performance of the data storage system, comparing the measured performance to the goal and assigning a fitness value to the new solution based on the comparison;

(G) including the new solution in the set of solutions;

(H) eliminating the solution in the set having the lowest fitness value; and (I) repeating steps (D) through (H) to generate a set of solutions having increased fitness values.

The sum of A, B and C may equal N.

According to yet another aspect, a method of controlling the performance of a data storage system which concurrently processes a number N of data requests, of which, a number A are of a first data request type, a number B are of a second data request type and a number C are of data request types other than the first and second data request types, includes:

(A) setting a performance goal for the data storage system; and (B) determining, through the use of a genetic algorithm, an optimum number $A_O$ of the first data request type an optimum number $B_O$ of the second data request type and an optimum number $C_O$ of the other data request types to concurrently process, to achieve the performance goal for the data storage system.

Step B may include:

(C) randomly selecting an initial set of solutions, each solution including initial numbers $A_I$ of the first data request type, $B_I$ of the second data request type and $C_I$ of the other data request types;

(D) evaluating each solution in the set of a period of time by processing the number $A_I$ of first data request types, $B_I$ second data request types and $C_I$ of the other data request types, measuring the performance of the data storage system, comparing the measured performance to the performance goal and assigning a fitness value to the solution based on the comparison, wherein solutions having a greater fitness value yield a performance closer to the performance goal than those having a lesser fitness value;

(E) selecting two of the solutions from the set by performing a weighted random selection, based on the fitness value assigned to each solution;

(F) combining the two selected solutions to obtain a new solution including a number $A_N$ of first data request types, a number $B_N$ of second data request types and a number $C_N$ of other data request types;

(G) evaluating the new solution by processing the number $A_N$ of first data request types, the number $B_N$ of second data request types and the number $C_N$ of other data request types, measuring the performance of the data storage system, comparing the measured performance to the performance goal and assigning a fitness value to the new solution based on the comparison;

(H) including the new solution in the set of solutions;

(I) eliminating the solution in the set having the lowest fitness value; and (J) repeating steps (E) through (I) to generate a set of solutions having increased fitness values.

BRIEF DESCRIPTION OF THE DRAWINGS

These and other features of the invention will become more readily apparent from the following detailed description when read together with the accompanying drawings, in which.

DETAILED DESCRIPTION

Figure 1:
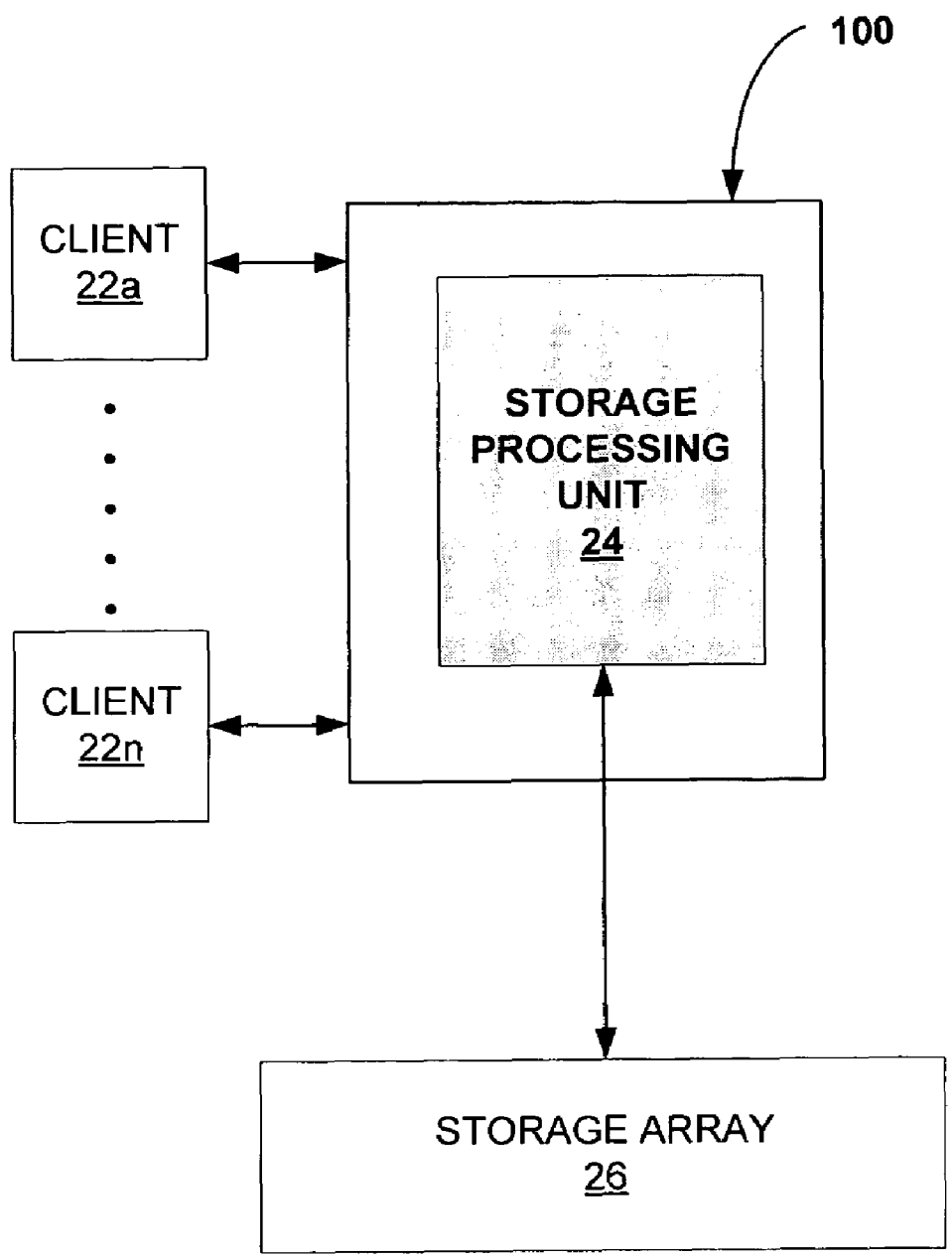
FIG. 1 is a schematic diagram of a data storage system which may utilize the method of the present invention.

FIG. 1 is a schematic block diagram of a data storage system 100 which performs a variety of data storage requests on behalf of client computers 22a-22n, external to the system 100. System 100 includes a storage processing unit 24, which controls the operation of the data storage system 100. In a preferred embodiment, storage processing unit 24 includes a pair of storage processors that are configured to perform data storage requests with a storage array 26 on behalf of one or more of the external client computers, and to perform such requests independently of and concurrently with data storage requests performed by the other storage processor. Accordingly, the data storage system 100 is well-suited for operating in an active-active manner in which the multiple storage processors perform data storage requests simultaneously in order to achieve greater throughput, i.e., a greater number of requests in a given amount of time than that provided by only one storage processor operating during that time. As set forth above, however, the processors are capable of processing a maximum number of data storage requests concurrently. Since different types of data storage requests can require different processing resources of the data storage system, in order to optimize the operation of a data storage system operating in a particular environment, it is necessary to limit the number of certain data requests that are processed by the system concurrently.

For example, in a system that concurrently processes both mail server requests, which can occur frequently and quickly, and data backup requests, which require more throughput to store larger amounts of data, without any control over the number of each type of request being processed, a greater number of the mail server requests will be processed concurrently, which can cause the application sending data backup requests to stall. Conversely, backup applications may not be able to achieve required backup-window because of the load imposed upon the system by mail server requests. Therefore, in order to optimize the operation of the data storage system, to enable both types of data requests to be processed concurrently in numbers that meet performance goals required by the operator of the system, the number of each type of request is controlled by the system.

Figure 2:
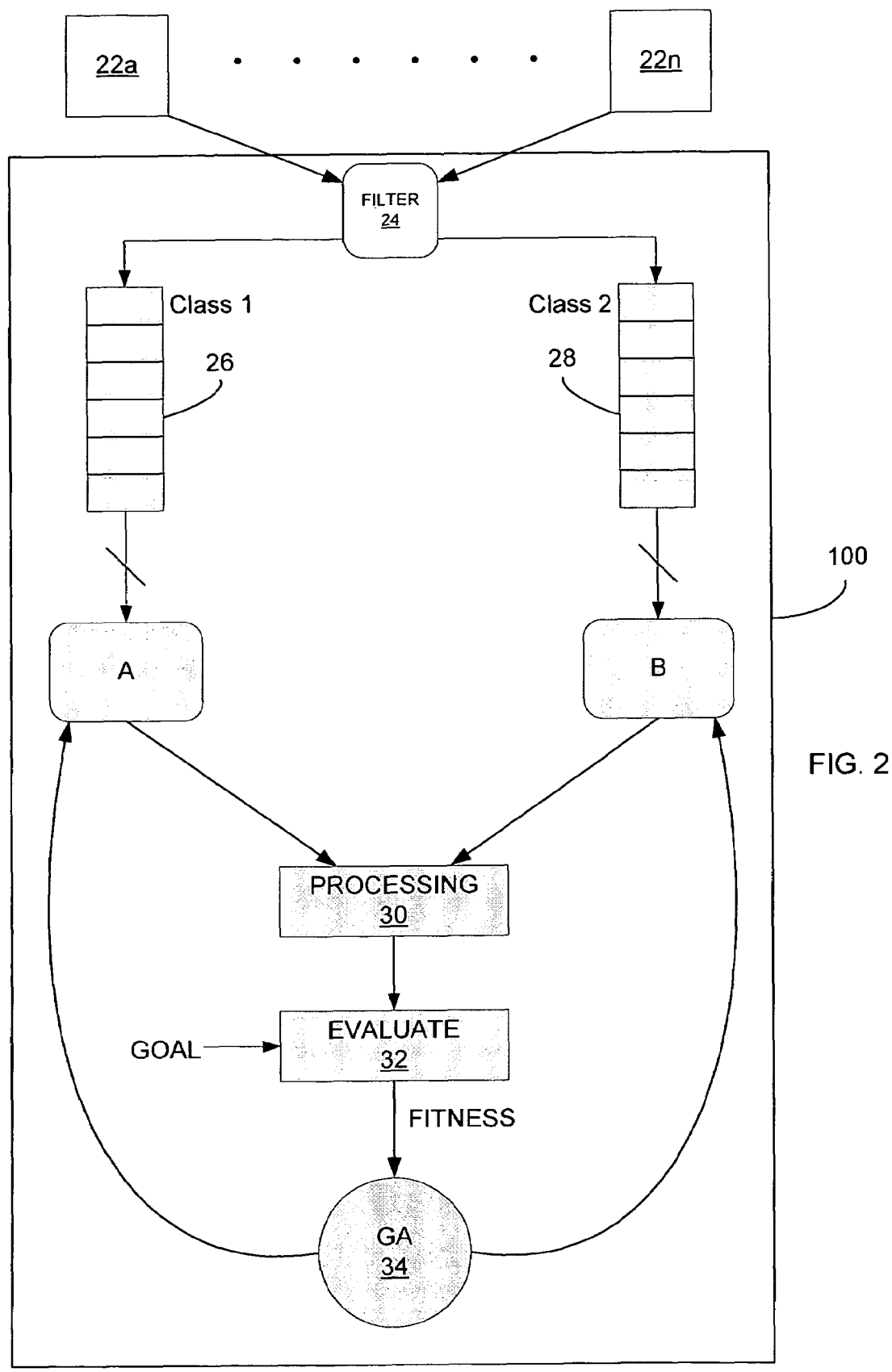
FIG. 2 is a schematic diagram showing the operation of one embodiment of the method according to the present invention.

FIG. 2 is a schematic functional diagram showing the method of optimizing the performance of a data storage system 100. Data requests for applications running on the data storage system are input to the data storage system 100 by each of the client computers 22a-22n. The data requests are received by a filter device 24, which separates the requests into classes, based on the type of the request. The data requests can be separated into types based on several factors, including the logical unit (LUN) associated with the data request, the size of the data request, the direction of the data request, i.e., if it is a read or write request and the identity of the client computer that has initiated the data request. Depending on the types of data requests being processed by the data storage system 100, the filter device 24 is programmed to sort the data requests into at least a first class including a particular type of request and a second class including other types of requests. In the example given above, the filter device 24 would sort the mail server requests into a first class and the data backup requests into a second class.

It is desirable to differentiate between request types because there may be cases when the performance-based resources (disk, storage processor and bus service times) are allocated to applications in an undesirable way. For example, two mail server systems can share the same disks. If one of the servers is dealing with mission critical mail and the other is doing routine mail and the system is overloaded, both mail systems will slow down equally. In this case the mail servers will use different logical unit numbers (LUNs) and we can use the LUNs to differentiate between applications. Sometimes, however, the applications may share the same LUN, for example, a database application and a data backup application. Since they are accessing the same data the LUN cannot be used to differentiate between the data request types. However they can be differentiated based on the I/O size. Typically database applications use small-size I/Os (<16 KB, for example) and backup applications use large-size I/Os (>64 KB, for example).

In general, once the incoming data requests are sorted into classes, the data requests sorted into a first class, Class 1, are input to a first queue 26 and the data request sorted into a second class, Class 2, are input to a second queue 28. Based on the operation of the data storage system 100, described in detail below, a number A of the Class 1 data requests and a number B of the Class 2 data requests will be concurrently processed by the data storage system in processing block 30. The performance of the data storage system when processing the A Class 1 data requests and the B Class 2 data requests is evaluated in evaluate block 32 and compared to a performance goal programmed into the data storage system by a user of the system via a graphical user interface resident on a host computer (not shown) which is utilized by a user of the data storage system 100 to input performance parameters. The goal could include processing at a desired processing speed for a certain class of data requests, achieving an average response time requirement, achieving a data request bandwidth requirement, etc. Based on the comparison of the evaluated performance and the performance goal, a fitness value is assigned to the particular solution of A Class 1 data requests and B Class 2 data requests. The solution is input to a set of other solutions of numbers of Class 1 and Class 2 data requests which are applied to a genetic algorithm in genetic algorithm device 34 to iteratively determine an optimal solution of numbers of Class 1 and Class 2 data requests that will be processed concurrently that will result in the evaluated performance most closely reaching the performance goal.

Regarding the genetic algorithm utilized in the invention, the process generally involves the following steps:

1) Generate a random set of solutions;
2) Evaluate each solution in the set by implementing it in the data processing system for an observation period, evaluating the data storage system performance, and assigning a fitness value to the solution;
3) Perform a weighted random selection, based on the fitness values, to select two solutions from the set. This process will favor the more appropriate solutions, i.e., those having higher fitness values, but not eliminate the chances of selecting a less appropriate solution in the set.
4) Apply a crossover function to the two selected solutions to generate a new solution. The crossover function generates a random combination of the two solutions.

5) In the case of approximately 5%-10% of the newly generated solutions, a mutation function is then applied. This can potentially completely alter the newly generated solution.
6) The new solution is the implemented and evaluated over an observation period. It is then included in the set of solutions, eliminating the solution having the lowest fitness value from the set.
7) Steps 3 through 6 are then repeated with this improved set of solutions to generate solutions that approach the performance goal.

Figure 4:
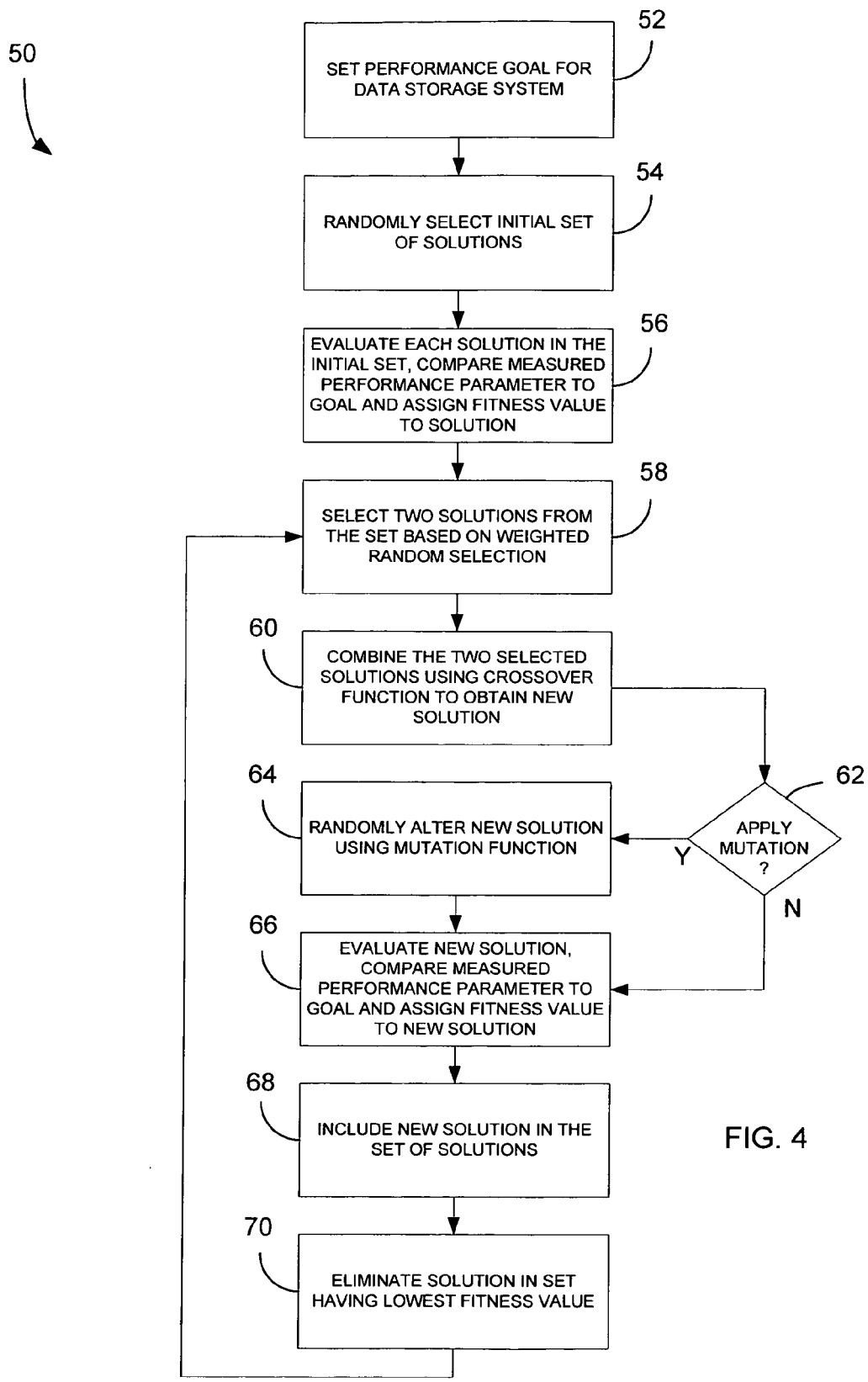
FIG. 4 is a flow diagram showing the steps involved in the method according to the present invention.

A more detailed description of the method is now provided by way of exampled with reference to FIG. 2 and FIG. 4, which is a flow diagram 50 showing the steps carried out by the data processing system 100. For the purpose of this example, the maximum number N of data requests that the data storage system 100 is able to concurrently process is 256. The Class 1 data requests are random multi-threaded 2 kb read requests and the Class 2 data requests are sequential single-threaded 64 kb read requests. When the data requests are being sorted into two classes, the number A of Class 1 data requests plus the number B of Class 2 data requests will equal the number maximum number N (256) of data requests that can be processed concurrently.

The performance goal input to the system through the graphical user interface of the host computer is to achieve 5 MB/s for the Class 2 data requests, Step 52. For the purpose of this example, the throughput of Class 2 data requests without any manipulation of the ratio of the number of concurrently processed data requests is 2 MB/s. An initial set of solutions are then generated in genetic algorithm device 34, Step 54. The initial set contains two lists of five solutions each, on e list corresponding to each of the classes being processed. This number of solutions is chosen for processing efficiency only, and any number of solutions may be used in the set. The initial set of solutions for this example is shown in Table 1.

TABLE 1

| | Concurrent IOs | | |
|---|---|---|---|
| | Class 1 (A) | Class 2 (B) | Fitness (F) |
| List 1 | 37 | 219 | 0.001342 |
| | 41 | 215 | 0.000428 |
| | 63 | 193 | 0.000340 |
| | 129 | 127 | 0.000340 |
| | 246 | 10 | 0.000307 |
| List 2 | 45 | 211 | 0.009096 |
| | 123 | 133 | 0.007648 |
| | 186 | 70 | 0.003205 |
| | 173 | 83 | 0.001679 |
| | 230 | 26 | 0.001173 |

As shown in the above table, each solution indicated a number A of data requests in Class 1 that will be processed concurrently with a number B of data requests in Class 2. In the first solution in List 1, A=37 and B=219. This means that 37 Class 1 data requests and 219 Class 2 data requests will be concurrently processed for a fixed period of time, which will be referred to as the "observation period". In one embodiment of the invention, the observation period is approximately twenty seconds. Once the solutions for each list are randomly generated, each solution is implemented in the processing block 30 for the observation period. During the observation period, the performance of the data storage system 100 is measured and compared to the performance goal of 5 MB/s for the Class 2 data requests. A fitness value for the solution is then generated based on this comparison and assigned to the solutions, Step 56. This implementation and evaluation process is carried out for each of the solutions in the set and the fitness value is generated for each of the solutions.

The fitness value is a relative indication of how close to the performance goal a particular solution causes the data storage system 100 to operate. While the fitness value may be generated in any number of ways, in one embodiment of the invention, the fitness value F is calculated as:

$$F = \frac{1}{\Sigma W \left( \frac{G-M}{G} \right)^2}$$  Eq. 1 where G is the performance goal, M is the measured performance and W is a weight factor applied to the solution. Weight indicates the importance assigned to each class in computing the fitness value. The fitness values indicated in List 1 were computed using a fitness function which assigns a weight of, for example, 0.8 to Class 1 and 0.2 to Class 2. For List 1, Class 1 is more important than Class 2. For List 2, Class 1 is assigned a weight of 0.2 while Class 2 is assigned a weight of 0.8. Hence Class 2 is more important for List 2. In Equation 1, the sum of $$\left( \frac{G-M}{G} \right)^2$$

multipled by the weight assigned to each class of the solution is summed to generate the reciprocal of the fitness value. It will be understood that any weight can be assigned to either of the Classes to favor one class over the other. As evidenced in the table, in both List 1 and List 2, solutions having a higher value of B for the Class 2 data requests have higher fitness values. This is because the goal of increasing the Class 2 data requests is achieved by increasing the number of Class 2 data requests that are processed concurrently. Furthermore, in List 2, where the Class 2 portion of each solution is weighted by 0.8 compared to 0.2 for the Class 1 portion, the fitness values are higher than in List 1, where the weights are 0.8 for Class 1 and 0.2 for Class 2.

Specifically, it should be noted that the solution (37, 219) of List 1 is more appropriate than the solution (246, 10). Since the goal requires speeding up of class 2 requests or slowing down of Class 1 requests, a limit of 37 on class 1 and 219 on class 2 performs better than a limit of 246 on class 1 and 10 on class 2. The fitness values assigned to each solution confirms this, as the solution (37, 219) has a much higher fitness value than the solution (246, 10).

Once the initial set has been evaluated in Step 56, new solutions need to be generated. For this, one solution is randomly selected from each list, weighted by its fitness value, Step 58. The probability P that a particular solution, A, is selected is given by the following equation:

$$P(A)=F(A)/93\ F(i)$$  Eq.2

Where F(A) is the fitness value of the solution A and F(i) is the fitness value of each solution in the list.

In this example, the random selection resulted in solutions (246, 10) and (123, 133) being selected. These two parent solutions selected in Step 58 are then combined using an arbitrary function, referred to as the crossover function, to obtain a new solution. The crossover function is random in nature. Hence the crossover function applied to the same two solutions multiple times can result in different solutions every time. Several crossover functions known in the art may be used in the invention.

In one embodiment of the invention, the new solution is obtained by generating a random number between the limits for that class in the two solutions. Hence, in the example solution, the new solution for Class 1 would be a random number between 246 and 123. This is done for each class.

In another embodiment, values are derived for each bit for the new solution. The binary representations of the solution for each class in the two parent solutions are considered. For the new solution, each bit value is inherited from either of the two solutions with equal probability. In the above example, 246 and 123 will be represented by bit patterns 11110110 and 01111011, respectively. Randomly selecting bit values from the $1^{st}$ or the $2^{nd}$ bit pattern resulted in 01110010, which represents 114. Hence the new solutions is (114, 142). As is described below, in a small number of the new solutions, less than 10% and preferably approximately 5%, a mutation function is applied to the new solution, Steps 62 and 64. If the mutation function will not be applied, the new solution is evaluated, the performance of the data storage system is measured with the solution implemented, the measured performance is compared to the performance goal and a fitness value is assigned to the solution, Step 66. Implementing this solution (114, 146) for an observation period results in a fitness value of 0.001805. Since the new solution (114, 146) yields better performance from the data storage system than the worst solution is each list ((246, 10) in List 1 and (230, 26) in List 2), based on the fitness values assigned to each solution, the new solution is included in each list of the set of solutions, Step 68 and the solution having the lowest fitness value in each list is eliminated from that list, Step 70, yielding the following new set of solutions (Table 2):

TABLE 2

| | Concurrent IOs | | |
|---|---|---|---|
| | Class1 (A) | Class2 (B) | Fitness (F) |
| List 1 | 37 | 219 | 0.001342 |
| | 41 | 215 | 0.000513 |
| | 63 | 193 | 0.000428 |
| | 114 | 146 | 0.000366 |
| | 129 | 127 | 0.000340 |
| eliminated ⟹ | ~~246~~ | ~~10~~ | ~~0.000307~~ |
| List 2 | 45 | 211 | 0.009096 |
| | 114 | 146 | 0.007648 |
| | 123 | 133 | 0.003205 |
| | 173 | 83 | 0.001807 |
| | 186 | 70 | 0.001679 |
| eliminated → | ~~230~~ | ~~26~~ | ~~0.001173~~ |

As set forth above, in less than all of the new solutions, and preferably approximately 5% of the new solutions generated in Step 60, a mutation function is applied to the new solution, Step 64. Several mutation functions known in the art may be utilized, as the function merely randomly changes the values of the new solution. A preferred function involves looking through the bit patterns of the solutions and randomly flipping bits (replacing 0 with 1 or 1 with 0) with a small fixed probability. This could result in a solution that is completely distinct from the parent solutions. Alternatively, a random number between 0 and 25 is either added or subtracted from the numbers A and B of the new solution.

The method then returns to Step 58, where two more solutions are randomly selected from the set of solutions, which two solutions are processed through Steps 60-70. This process is repeated during the operation of the data storage system 100, which results in the solution sets including solutions having higher fitness values, meaning that the method is generating solutions that have higher fitness values than previous solutions.

In the example, after several iterations of the genetic algorithm, the performance of the data storage system increases significantly, and the goal of 5 MB/s for the Class 2 data requests is reached. After 250 iterations, the set of solutions is as follows:

TABLE 3

| | Concurrent IOs | | |
|---|---|---|---|
| | Class 1 (A) | Class 2 (B) | Fitness (F) |
| List 1 | 33 | 223 | 0.004304 |
| | 34 | 222 | 0.003764 |
| | 37 | 219 | 0.003655 |
| | 38 | 218 | 0.002662 |
| | 42 | 214 | 0.002101 |
| List 2 | 33 | 223 | 0.017217 |
| | 34 | 222 | 0.015056 |
| | 37 | 219 | 0.014620 |
| | 38 | 218 | 0.010647 |
| | 42 | 214 | 0.008404 |

The table consists of two lists of 5 solutions each. In the example, the solutions in both lists are identical. The reason for this was that a goal was not set for Class 1. Hence both lists favored solutions that enabled Class 2 to meet its goal.

As can be seen in the above table, through multiple iterations of the method, solutions are generated having numbers A and B for the number of Class 1 and Class 2 data requests, respectively, that are processed concurrently, and that result in fitness values that are much higher that those in the initial set of solutions. This indicates that the solutions generated through multiple iterations enable the data storage system to approach, meet or even surpass the performance goal initially programmed into the system.

The invention also enables a user of the data storage system 100 to set goals for both types of data requests. For instance, in the above example, in addition to a goal of 5 MB/s for the Class 2 data requests, the user could set a goal for the Class 1 data requests as well. When a goal is set for both classes, during the evaluation steps, Steps 56 and 66, the goal value G and the weight value W will be different for each class number (A, B) in a solution when Equation 1 is applied to determine the fitness value F for the solution.

Figure 3:
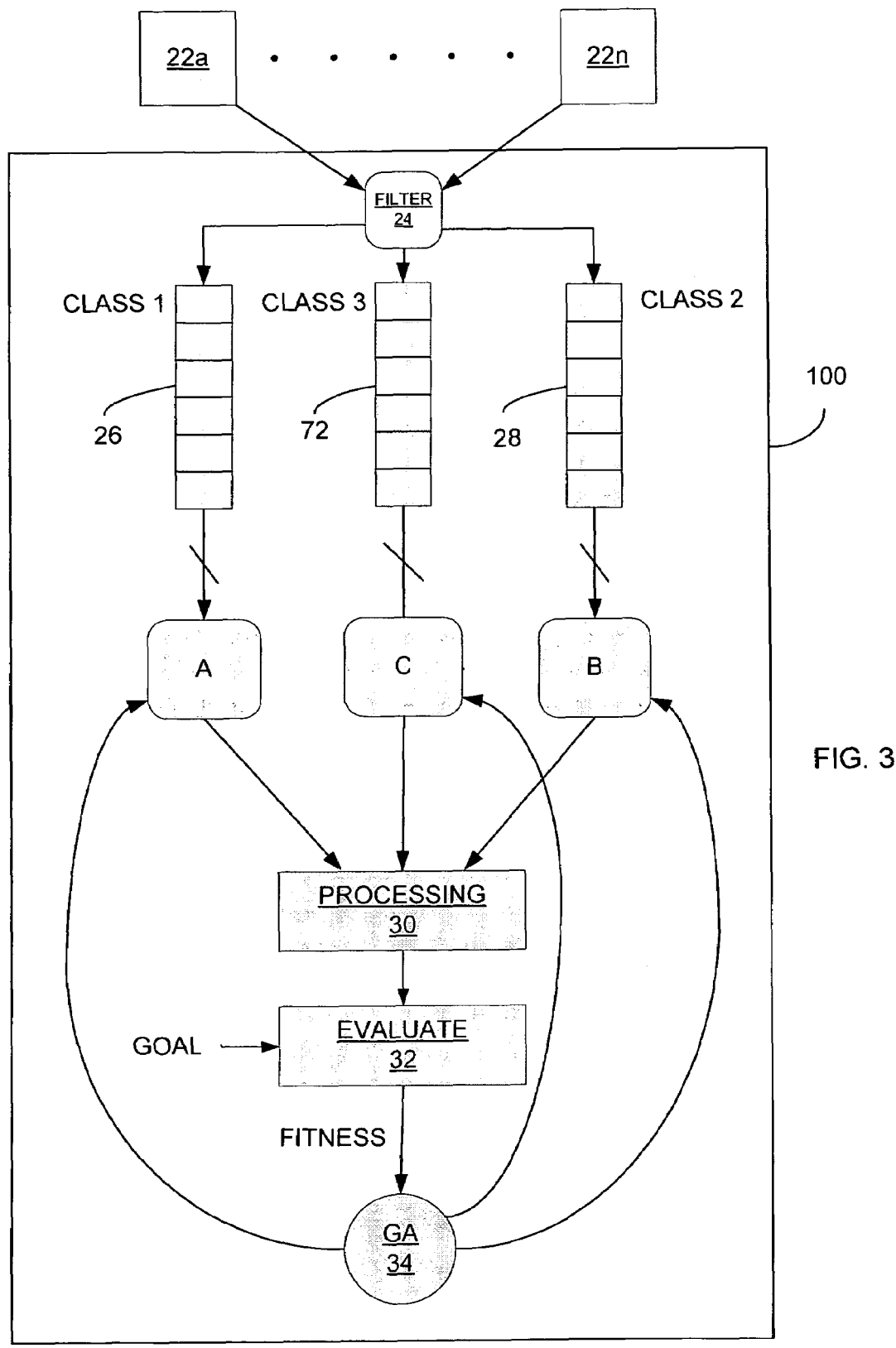
FIG. 3 is a schematic diagram showing the operation of another embodiment of the method according to the present invention.

Furthermore, the invention may be implemented in a data storage system having more than two classes of data requests. Following the example described above, and referring to FIG. 3, the Class 1 data requests are random multi-threaded 2 kb read requests and the Class 2 data requests are sequential single-threaded 64 kb read requests. Additionally, the Class 3 data requests can be any data requests types that are not Class 1 data requests or Class 2 data requests. These Class 3 data requests are sorted by filter 24 and input to queue 72 for concurrent processing with the Class 1 and Class 2 data requests. The number C of Class 3 data requests that will be processed concurrently with the number A of Class 1 data requests and the number B of Class 2 data requests will be generated and evaluated in the same manner as described above with reference to the flow diagram of FIG. 3. However, because there are three classes being sorted and evaluated, in Step 54, the initial set of solutions will include three lists of solutions, as shown in Table 4:

TABLE 4

|  | | Concurrent IOs | | |
|---|---|---|---|---|
|  | Class 1 (A) | Class 2 (B) | Class 3 (C) | Fitness (F) |
| List 1 | 27 | 209 | 20 | 0.001689 |
|  | 38 | 205 | 13 | 0.000927 |
|  | 56 | 153 | 47 | 0.000747 |
|  | 142 | 70 | 44 | 0.000419 |
|  | 203 | 18 | 35 | 0.000246 |
| List 2 | 15 | 201 | 40 | 0.009123 |
|  | 104 | 110 | 42 | 0.007216 |
|  | 137 | 88 | 31 | 0.004589 |
|  | 186 | 53 | 17 | 0.003016 |
|  | 200 | 14 | 42 | 0.001942 |
| List 3 | 33 | 214 | 9 | 0.003476 |
|  | 61 | 172 | 23 | 0.002001 |
|  | 94 | 127 | 35 | 0.001538 |
|  | 155 | 81 | 20 | 0.000893 |
|  | 198 | 36 | 22 | 0.000615 |

The Class 3 data requests will also have a weight applied during the evaluation process in Step 56, which will be the same as the weight applied to the less favored class in the list. For example, in the example above in List 1 of Table 1, Class 1 is given a weight of 0.8 and Class 2 is given a weight of 0.2, and in List 2 of Table 1, Class 1 is given a weight of 0.2 and Class 2 is given a weight of 0.8. In the example of Table 4, the Class 3 data requests are also given a weight of 0.2 in both Lists 1 and 2. In List 3, Classes 1 and 2 are given a weight of 0.2 and, because Class 3 has no goals assigned to it, its weight has no consequence to the evaluation. Therefore, the weight of Class 3 in List 3 is ignored.

In Step 58, the random selection first involves randomly selecting two of the three lists and then randomly selecting a solution from each of the two selected lists. After Steps 60-66 are performed as described above, the new solution is included in each list of the solution set that has a solution having a lower fitness value than the new solution. This process is repeated during the operation of the data storage system and the performance of the data storage system is evaluated with the implementation of each of the solutions selected from the solution set. In this way, solutions are generated which, when implemented, enable the data storage system to approach, meet or exceed the performance goal.

In an alternative embodiment, the disclosed method for controlling the performance of a data storage system may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described therein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Accordingly, the invention provides a method for controlling the operation of a data storage system by generating solutions which instruct the data storage system to process combinations of data request types in numbers that enable the data storage system to achieve a performance goal set by the user of the system. The method utilizes a genetic algorithm to iteratively generate solutions which are implemented by the data storage system. The genetic algorithm automatically adjusts throttles in the system to achieve the set performance goals. The resulting performance of the data storage system is measured and the solution is compared to previous solutions based on a fitness value that is generated based on a comparison of the measured performance when the solution is implemented and the performance goal. Thus, the user of the data storage system 100 is able to specify performance requirements or goals of the system without having to understand the underlying architecture and without directly manipulating operating parameters.

It will be understood that the description set forth above is by way of example only and other implementations may be practiced and be within the scope of the invention. For example, while the maximum number of data requests that can be concurrently processed is indicated as being 256 in the example, the storage processing unit 24 may include multiple processors and may be capable of processing many more data requests concurrently, such as 512 data requests, 1026 data requests or more. Furthermore, any number of classes of data requests may be specified for evaluation. However, the set of solutions will have as many lists as classes that are being evaluated and, in Step 58, two of the lists will be randomly selected to have a solution randomly selected therefrom. Also, performance goals may be set for more than two classes that are being evaluated. When the fitness value for a solution is being generated in Steps 56 and 66, the goal and weight applied to the measured performance in Equation 1 will be different for each number of a class that has a performance goal set. Moreover, while each list of each solution set is described as having five solutions, more or fewer solution may be included in each list.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of controlling the performance of a data storage system which concurrently processes a number N of data requests, of which, a number A are of a first data request type and a number B are of a second data request type, the method comprising:
   (A) setting a performance goal for the data storage system; and
   (B) determining, through the use of a genetic algorithm, an optimum number $A_O$ of the first data request type and an optimum number $B_O$ of the second data request type to concurrently process, to achieve the performance goal for the data storage system; and
   operating the data storage system to concurrently process the number $A_O$ first data request types and the number $B_O$ second data request types to cause the data storage system to perform in accordance with the performance goal.

2. The method of claim 1 wherein Step B comprises:
   (C) randomly selecting a set of solutions, each solution including initial numbers $A_I$ of the first data request type and $B_I$ of the second data request type;
   (D) evaluating each solution in the set for a period of time by processing the number $A_I$ of first data request types and $B_I$ second data request types, measuring the performance of the data storage system, comparing the measured performance to the performance goal and assigning a fitness value to the solution based on the comparison, wherein solutions having a greater fitness value yield a performance closer to the performance goal than those having a lesser fitness value;
   (E) selecting two of the solutions from the set by performing a weighted random selection, based on the fitness value assigned to each solution;
   (F) combining the two selected solutions to obtain a new solution including a number $A_N$ of first data request types and a number $B_N$ of second data request types;
   (G) evaluating the new solution by processing the number $A_N$ of first data request types and $B_N$ second data request types, measuring the performance parameter, comparing the measured performance to the performance goal and assigning a fitness value to the new solution based on the comparison;
   (H) including the new solution in the set of solutions;
   (I) eliminating the solution in the set having the lowest fitness value; and
   (J) repeating steps (E) through (I) to generate a set of solutions having increased fitness values, until the optimum number $A_O$ of the first data request type and the optimum number $B_O$ of the second data request type are determined.

3. The method of claim 2 further comprising, in less than all of the new solutions, randomly altering the new solution after step (F).

4. The method of claim 3 wherein the randomly altering step comprises applying a mutation function to the new solution.

5. The method of claim 4, wherein the random altering step is performed in less than approximately 10% of the new solutions.

6. The method of claim 5, wherein the random altering step is performed in approximately 5% of the new solutions.

7. The method of claim 2 wherein the set of solutions includes a first list of solutions for the first data request type and a second list of solutions for the second data request type.

8. The method of claim 7 wherein, in Step E, one solution is selected from each of the first and second lists in the set.

9. The method of claim 7 wherein fitness values assigned to solutions in the first list are weighed differently than fitness values assigned to solutions in the second list.

10. The method of claim 1 wherein the performance parameter includes one of inputs/outputs per second, a response time for a request type and a throughput amount for a request type.

11. The method of claim 1 wherein A+B=N.

12. A method of controlling the performance of a data storage system which concurrently processes a number N of data requests, of which, a number A are of a first data request type and a number B are of a second data request type, the method comprising:
   (A) setting a performance goal for the data storage system; and
   (B) randomly selecting a set of solutions, each solution including initial numbers $A_I$ of the first data request type and $B_I$ of the second data request type;
   (C) evaluating each solution in the set for a period of time by processing the number $A_I$ of first data request types and $B_I$ second data request types, measuring the performance of the data storage system, comparing the measured performance to the performance goal and assigning a fitness value to the solution based on the comparison, wherein solutions having a greater fitness value yield a performance closer to the performance goal than those having a lesser fitness value;
   (D) selecting two of the solutions from the set by performing a weighted random selection, based on the fitness value assigned to each solution;
   (E) combining the two selected solutions to obtain a new solution including a number $A_N$ of first data request types and number $B_N$ of second data request types;
   (F) evaluating the new solution by processing the number $A_N$ of first data request types and $B_N$ second data request types, measuring the performance of the data storage system, comparing the measured performance to the performance goal and assigning a fitness value to the new solution based on the comparison;
   (G) including the new solution in the set of solutions;
   (H) eliminating the solution in the set having the lowest fitness value;
   (I) repeating steps (D) through (H) to generate a set of solutions having increased fitness values, until the optimum number $A_O$ of the first data request type and the optimum number $B_O$ of the second data request type are determined; and
   (J) operating the data storage system to concurrently process the number $A_O$ first data request types and the number $B_O$ second data request types to cause the data storage system to perform in accordance with the performance goal.

13. The method of claim 12 further comprising, in less than all of the new solutions, randomly altering the new solution after step (F).

14. The method of claim 13 wherein the randomly altering step comprises applying a mutation function to the new solution.

15. The method of claim 13, wherein the random altering step is performed in less than approximately 10% of the new solutions.

16. The method of claim 15, wherein the random altering step is performed in approximately 5% of the new solutions.

17. The method of claim 12 wherein the performance parameter includes one of inputs/outputs per second, a response time for a request type and a throughput amount for a request type.

18. The method of claim 12 wherein A+B=N.

19. The method of claim 12 wherein the set of solutions includes a first list of solutions for the first data request type and a second list of solutions for the second data request type.

20. The method of claim 19 wherein, in Step D, one solution is selected from each of the first and second lists in the set.

21. The method of claim 19 wherein fitness values assigned to solutions in the first list are weighted differently than fitness values assigned to solutions in the second list.

22. A method of controlling the performance of a data storage system which concurrently processes a number N of data requests, of which, a number A are of a first data request type, a number B are of a second data request type and a number C are of data request types other than the first and second data request types, the method comprising:

(A) setting a performance goal for the data storage system;

(B) randomly selecting a set of solutions, each solution including initial numbers $A_I$ of the first data request type, $B_I$ of the second data request type and $C_I$ of the other data request types;

(C) evaluating each solution in the set for a period of time by processing the number $A_I$ of first data request types, $B_I$ second data request types and $C_I$ of the other data request types, measuring the performance of the data storage system, comparing the measured performance to the goal and assigning a fitness value to the solution based on the comparison, wherein solutions having a greater fitness value yield a performance closer to the performance goal than those having a lesser fitness value;

(D) selecting two of the solutions from the set by performing a weighted random selection, based on the fitness value assigned to each solution;

(E) combining the two selected solutions to obtain a new solution including a number $A_N$ of first data request types, a number $B_N$ of second data request types and a number $C_N$ of other data request types;

(F) evaluating the new solution by processing the number $A_N$ of first data request types, the number $B_N$ of second data request types and the number $C_N$ of other data request types, measuring the performance of the data storage system, comparing the measured performance to the performance goal and assigning a fitness value to the new solution based on the comparison;

(G) including the new solution in the set of solutions;

(H) eliminating the solution in the set having the lowest fitness value; and (I) repeating steps (D) through (H) to generate a set of solutions having increased fitness values, until an optimum number $A_O$ of the first data request type, an optimum number $B_O$ of the second data request type and an optimum number $C_O$ of the other data request types are determined; and (J) operating the data storage system to concurrently process the number $A_O$ first data request types, the number $B_O$ second data request types and the number $C_O$ other data request types to cause the data storage system to perform in accordance with the performance goal.

23. The method of claim 22 further comprising, in less than all of the new solutions, randomly altering the new solution after step (F).

24. The method of claim 23 wherein the randomly altering step comprises applying a mutation function to the new solution.

25. The method of claim 23, wherein the random altering step is performed in less than approximately 10% of the new solutions.

26. The method of claim 25, wherein the random altering step is performed in approximately 5% of the new solutions.

27. The method of claim 22 wherein the performance parameter includes one of inputs/outputs per second, a response time for a request type and a throughput amount for a request type.

28. The method of claim 22 wherein A+B+C=N.

29. The method of claim 22 wherein the set of solutions includes a first list of solutions for the first data request type, a second list of solutions for the second data request type and a third list of solutions for the other data request types.

30. The method of claim 29 wherein, in Step D, one solution is selected from two of the first, second and third lists in the set.

31. The method of claim 29 wherein fitness values assigned to solutions in the first list are weighted differently than fitness values assigned to solutions in the second list.

32. A computer program product, embodied on a computer readable medium, having computer readable program code thereon for controlling the performance of a data storage system including a storage processing unit which concurrently processes a number N of data requests, of which, a number A are of a first data request type and a number B are of a second data request type, the computer readable program code determining, through the use of a genetic algorithm, an optimum number $A_O$ of the first data request type and an optimum number $B_O$ of the second data request type for the storage processing unit to concurrently process, to enable the data storage system to operate at a performance goal for the data storage system.

33. The computer program product of claim 32, wherein the computer readable program code:

(A) randomly selects a set of solutions, each solution including initial numbers $A_I$ of the first data request type and $B_I$ of the second data request type;

(B) evaluates each solution in the set for a period of time by processing the number $A_I$ of first data request types and $B_I$ second data request types, measuring the performance of the data storage system, comparing the measured performance to the performance goal and assigning a fitness value to the solution based on the comparison, wherein solutions having a greater fitness value yield a performance closer to the performance goal than those having a lesser fitness value;

(C) selects two of the solutions from the set by performing a weighted random selection, based on the fitness value assigned to each solution;

(D) combines the two selected solutions to obtain a new solution including a number $A_N$ of first data request types and a number $B_N$ of second data request types;

(E) evaluates the new solution by processing the number $A_N$ of first data request types and the number $B_N$ of second data request types, measuring the performance of the data storage system, comparing the measured performance to the performance goal and assigning a fitness value to the new solution based on the comparison;
(F) includes the new solution in the set of solutions;
(G) eliminates the solution in the set having the lowest fitness value; and
(H) repeats steps (C) through (G) to generate a set of solutions having increased fitness values, until the optimum number $A_O$ of the first data request type and the optimum number $B_O$ of the second data request type are determined;

the data storage system being controlled to concurrently process the number $A_O$ first data request types and the number $B_O$ second data request types to cause the data storage system to perform in accordance with the performance goal.

34. The computer program product of claim 33 further comprising, in less than all of the new solutions, randomly altering the new solution after step (D).

35. The computer program product of claim 34 wherein the randomly altering step comprise applying a mutation function to the new solution.

36. The computer program product of claim 34, wherein the random altering step is performed in less than approximately 10% of the new solutions.

37. The computer program product of claim 36, wherein the random altering step is performed in approximately 5% of the new solutions.

38. The computer program product of claim 33 wherein the performance parameter includes one of inputs/outputs per second, a response time for a request type and a throughput amount for a request type.

39. The computer program product of claim 33 wherein A+B=N.

40. The computer program product of claim 33 wherein the set of solutions includes a first list of solutions for the first data request type and a second list of solutions for the second data request type.

41. The computer program product of claim 40 wherein fitness values assigned to solutions in the first list are weighted differently than fitness values assigned to solutions in the second list.

* * * * *